(12) United States Patent
Kallus et al.

(10) Patent No.: US 10,455,299 B2
(45) Date of Patent: Oct. 22, 2019

(54) OPTIMIZED SMART METER REPORTING SCHEDULE

(71) Applicant: Telefonaktiebolaget LM Ericsson (publ), Stockholm (SE)

(72) Inventors: Zsófia Kallus, Budapest (HU); Péter Hága, Budapest (HU); Zsolt Kenesi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/081,576

(22) PCT Filed: Mar. 8, 2016

(86) PCT No.: PCT/EP2016/054874
§ 371 (c)(1),
(2) Date: Aug. 31, 2018

(87) PCT Pub. No.: WO2017/152951
PCT Pub. Date: Sep. 14, 2017

(65) Prior Publication Data
US 2019/0098377 A1    Mar. 28, 2019

(51) Int. Cl.
*H04Q 9/00* (2006.01)
*H04B 3/54* (2006.01)

(52) U.S. Cl.
CPC ............... *H04Q 9/00* (2013.01); *H04B 3/54* (2013.01); *H04B 2203/5433* (2013.01); *H04Q 2209/30* (2013.01)

(58) Field of Classification Search
CPC ........ H04Q 9/00; H04Q 2209/30; H04B 3/54; H04B 2203/5433
See application file for complete search history.

(56) References Cited

U.S. PATENT DOCUMENTS

| 9,002,393 B2 | 4/2015 | Wang et al. |
| 2002/0130768 A1 | 9/2002 | Che et al. |

(Continued)

FOREIGN PATENT DOCUMENTS

| EP | 2597911 A1 | 5/2013 |
| EP | 2660765 A1 | 11/2013 |
| WO | WO 2014155987 A1 | 10/2014 |

OTHER PUBLICATIONS

International Search Report and Written Opinion of the International Searching Authority, PCT/EP2016/054874, dated Jul. 7, 2016, 12 pages.

*Primary Examiner* — Nader Bolourchi
(74) *Attorney, Agent, or Firm* — Sage Patent Group

(57) ABSTRACT

The invention relates to a method for determining, by a scheduler, at least one transmission parameter for each of a plurality of smart meters which each transmit, via power line communication, a measurement report to a control entity. The at least one transmission parameter allows a reporting time for a corresponding smart meter to be determined. The method comprises the following steps: At least one status parameter is collected for each of the plurality of smart meters, the at least one status parameter influencing a success rate of the transmission of the corresponding measurement report to the control entity. For each of the plurality of smart meters, the at least one transmission parameter allowing the reporting time for the corresponding smart meter to be determined, is determined based on the collected at least one status parameter.

20 Claims, 5 Drawing Sheets

(56) References Cited

U.S. PATENT DOCUMENTS

| | | | |
|---|---|---|---|
| 2011/0095608 A1 | 4/2011 | Jonsson et al. | |
| 2013/0294237 A1* | 11/2013 | Osterloh | G01D 4/004 370/235 |
| 2015/0345986 A1 | 12/2015 | Yamamoto et al. | |

* cited by examiner

OPTIMIZED SMART METER REPORTING SCHEDULE

CROSS REFERENCE TO RELATED APPLICATIONS

This application is a 35 U.S.C. § 371 national stage application of PCT International Application No. PCT/EP2016/054874 filed on Mar. 8, 2016, the disclosure and content of which is incorporated by reference herein in its entirety.

TECHNICAL FIELD

The present invention relates to a method for determining a transmission parameter for a smart meter. The invention furthermore relates to a method for operating a smart meter. Furthermore, a scheduler and the corresponding smart meter is provided. Further, a computer readable storage medium is provided and a system comprising the scheduler and the smart meter.

BACKGROUND

Smart Meter (SM) deployment is an essential pillar of the Smart Grid having an increased market penetration around the world. Electricity providers can leverage the automated reporting system of residential metres through data concentrator (DC) nodes and a central analytics and control system called the Head-End-System (HES), or simply control entity hereinafter.

Today a wide-spread communication technology is the Power Line Communication (PLC) between SM's and DC's, which is a cost-effective solution using the already available electricity network infrastructure.

The PLC technology suffers from several limitations, since the power line networks were not designed for communication purposes. It is considered a harsh environment as the signal-to-noise ratio (SNR) is significantly limited by interference effects and noise of other electric devices connected to the network. Furthermore, communication signals transform the power line into a radio antenna representing a potential threat to the radio communication channels in its proximity, thus minimizing the number of messages used is preferable. Narrow-band PLC devices can follow the solution of open standards, where risk of interference effects is minimized. There are a number of methods for optimizing PLC, but their main purpose is out of scope of this invention, e.g. to regulate frequency use inhibiting the radio interference or adapting existing control algorithms to the large delays accepted to be present in the system.

There are more advanced technologies on the market, e.g. Point-to-Point (P2P) and RF mesh, which enable more reliable communication and better quality. However, due to financial and security constraints, typically only a small number of advanced devices complement the PLC SM's for increased reliability of the reporting system.

Typical use of such technology is the remote reading of meters for automatic billing purposes. This scenario is enabled by the currently used process: the control entity sends signal to meters during a pre-fixed period of time daily and recalls only meters where reporting was not successful, checking periodically until next pull cycle is started.

The scheduling of smart meter event transmission ('transmit window') is based on global optimum search in which the reporting time is preconfigured to a fixed time of the day. This fixed reporting time is set to the time when the global communication quality offers the highest probability on average to successfully transmit the meter events.

In connection with FIGS. 1 to 3 the drawbacks of the fixed reporting times is shown. The results shown in FIGS. 1 to 3 are based on measurements collected from smart meters using PLC technology during a period of several weeks. FIG. 1 shows a mean measurement quality over time defined by the hourly success ratio of ping messages sent by each data concentrator to its corresponding smart meter.

FIG. 2 shows the time series of number of event recordings at the smart meters indicated by graph 20 in FIG. 2. Graph 21 shows the total number of events processed by the control entity. It can be deduced from FIG. 2 that the reporting times correspond to periods when least of the events are recorded. The processing of the events shown by graph 21 also indicates how the repeated queries reach the blocked smart meters in attenuated waves until the next daily cycle begins.

FIG. 3 shows cumulative distribution function of delays measured between recording of a measurement event at the smart meter and processing of the same event at the control entity. It can be deduced that some of the events are processed within half day of delay and there are events which are not processed within a day following recording. This behavior is the main obstacle of further functionalities of a smart grid, where control processes would rely on the near real-time monitoring of the system.

SUMMARY

Accordingly a need exists to overcome the above mentioned drawbacks and to provide a system in which the collecting of meter data is improved.

This need is met by the features of the independent claims. Further aspects are described in the dependent claims.

According to a first aspect a method for determining at least one transmission parameter for each of a plurality of smart meters is provided, wherein the method is carried out by a scheduler, wherein each smart meter transmits a measurement report to a control entity, wherein the at least one transmission parameter allows a reporting time for the corresponding smart meter to be determined. The method comprises the step of collecting at least one status parameter for each of the plurality of smart meters, wherein the at least one status parameter influences a success rate of the transmission of the corresponding measurement report to the control entity. Furthermore, the at least one transmission parameter allowing the reporting time for the corresponding smart meter to be determined is determined, for each of the plurality of smart meters, based on the collected at least one status parameter. The at least one transmission parameter may be transmitted to the corresponding smart meter and/or may be stored in a schedule database.

With the above described method an individual reporting time can be determined for each smart meter. Thus, not all the smart meters will transmit that measurement report at the same time considered appropriate for the whole system comprising a plurality of smart meters. This, however, means that the different measurement reports will not arrive at the control entity at the same time, but are distributed over time as reporting times are determined individually. Accordingly, a near real-time processing at the control entity becomes possible. Furthermore, it is possible to take into account the status at the corresponding smart meter. An individual transmit time can be determined for each smart meter, a transmission time with a lower success rate can be avoided so that the success rate of the transmission of the measurement report increases. This leads to a smaller number of retransmissions of the measurement report, the retransmission rate is minimized.

Additionally, the corresponding scheduler is provided which is configured to determine at least one transmission parameter for each of the plurality of smart meters which each transmits, via power line communication, a measurement report to the control entity. The scheduler comprises a memory and at least one processor, wherein the memory contains instructions executable by said at least one processor and the scheduler is operative to carry out the steps mentioned above and mentioned in more detail below.

The scheduler comprises a first module configured to collect at least one status parameter for each of the plurality of smart meters, the at least one status parameter influencing a success rate of the transmission of the corresponding measurement report to the control entity and a second module configured to determine for each of the plurality of smart meters (200, 1000), the at least one transmission parameter allowing the reporting time for the corresponding smart meter to be determined, based on the collected at least one status parameter.

According to a further aspect, a method for operating a smart meter connected by a power line to a control entity is provided, wherein the smart meter collects meter data of the smart meter and receives at least one transmission parameter which allows a reporting time for a measurement report comprising the collected data for the smart meter to be determined. Furthermore, a reporting time is determined taking the received parameter into account and the measurement report is transmitted to the control entity at the determined reporting time.

Additionally, the corresponding smart meter is provided configured to generate the measurement data, the smart meter comprising a memory and at least one processor, wherein the memory contains instructions executable by the at least one processor. The smart meter is operative to carry out the above mentioned steps of the smart meter.

The smart meter comprises a first module configured to collect meter data of the smart meter and a second module configured to receive at least one transmission parameter, the at least one transmission parameter allowing a reporting time for a measurement report comprising the collected meter data for the smart meter to be determined. A third module of the smart meter is configured to determine a reporting time taking the received transmission parameter into account, and a fourth module is configured to transmit the measurement report to the control entity (45) at the determined reporting time.

Furthermore, a computer readable storage medium is provided having stored thereon a computer program, wherein execution of the computer program by at least one processor of the scheduler causes the at least one processor to execute a method for determining at least one transmission parameter by the scheduler as mentioned above.

Additionally, a computer readable storage medium is provided having stored thereon a computer program, wherein execution of the computer program by at least one processor of a smart meter causes the at least one processor to execute a method for operating a smart meter as mentioned above.

According to a further aspect, a system comprising a scheduler as mentioned above and comprising a smart meter as mentioned above is provided.

Additionally a system is provided configured to determine at least one transmission parameter for each of a plurality of smart meters which each transmit, via power line communication, a measurement report to a control entity, the at least one transmission parameter allowing a reporting time for a corresponding smart meter to be determined. The system is configured to determine, for each of the plurality of smart meters, the at least one transmission parameter allowing the reporting time for the corresponding smart meter to be determined, based on at least one status parameter obtained for each of the plurality of smart meters, the at least one status parameter influencing a success rate of the transmission of the corresponding measurement report to the control entity. The system may be implemented in a cloud computing environment by a plurality of processing entities, with each of the processing entities being configured to provide the functionality of the system mentioned above.

It is to be understood that the features mentioned above and features yet to be explained below can be used not only in the respective combinations indicated, but also in other combinations or in isolation without departing from the scope of the present invention. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

Figure 1:
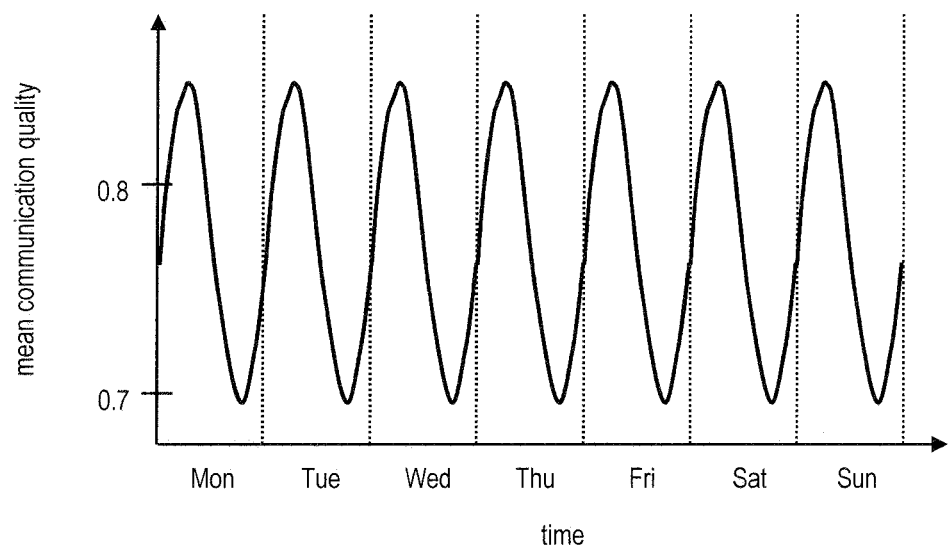
FIG. 1 shows time series of communication quality based measurement results collected by several thousand smart meters.
Figure 2:
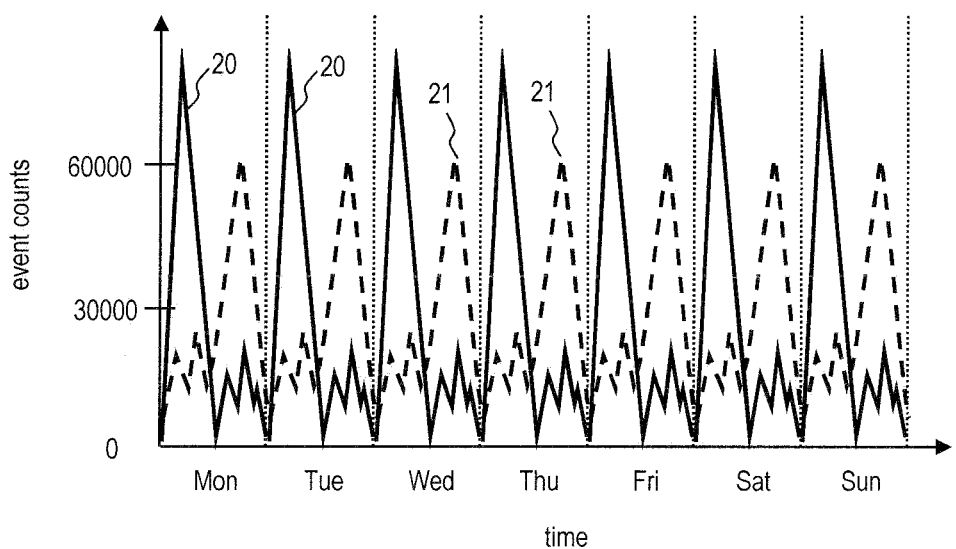
FIG. 2 shows the time series of processed events at the central control entity and events recorded at the smart meters.
Figure 3:
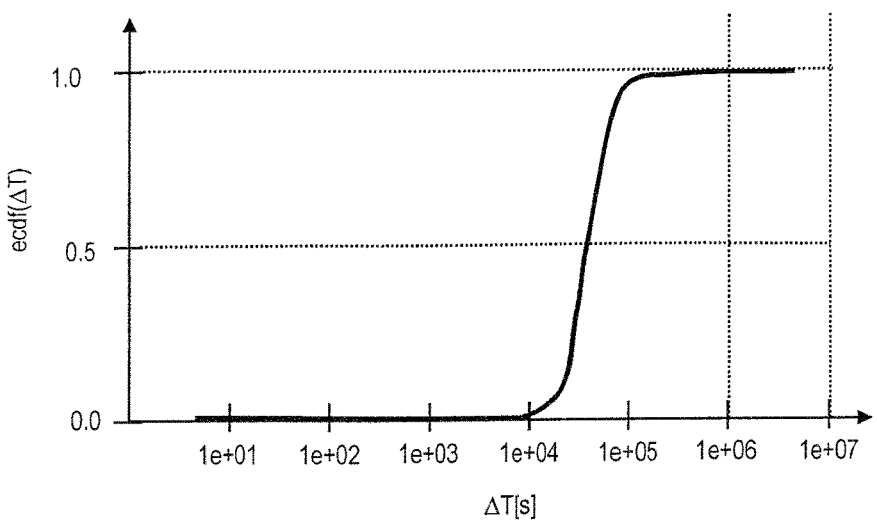
FIG. 3 depicts a cumulative distribution function of delays measured between recording of a measurement report at the smart meter and processing of the same report at a control entity.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

In the following, a system comprising a scheduler and a smart meter will be discussed in which one or more communication related status parameters, which influence a success rate of the transmission of a measurement report of a smart meter to a control entity, are collected and analyzed. Scheduling algorithms allowing a reporting time for a smart meter to be determined are proposed. The scheduling algorithm can take advantage from historical and real-time analysis of the status parameters. The proposed method also enables to set a transmission parameter which allows a reporting time for the individual smart meter to be determined in runtime according to a configured schema. The reporting time is thus not fixed in advance and can be set on individual meter level. As discussed in more detail below, the scheduler keeps the transmit schema or reporting time for the smart meters where the reporting time might be different for different smart meters. For the reporting time, different kinds of scheduling may be used, from random selections to complex machine learning based solutions.

Figure 4:
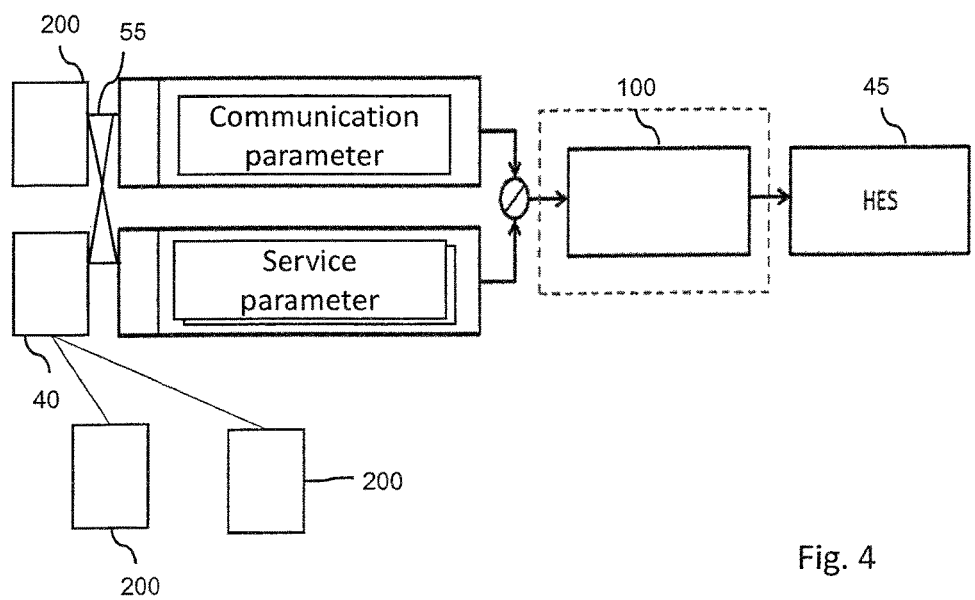
FIG. 4 shows an example system including a scheduler and a control entity in a high-level architecture comprising features of the invention.

FIG. 4 shows a high-level architecture of the system in which a scheduler 100 individually determines transmission parameters for a plurality of smart meters 200, wherein only a single smart meter 200 is shown in the embodiment of FIG. 4. The smart meters are connected to the power line network and use this same network for communication purposes as well. Thus the power line network becomes their communication network and power line communication technology is used for transmitting smart meter data to a central control entity 45 via power line 55. The smart meter is logically connected to scheduler 100 via power line 55, and data collectors such as collector 40 may be provided which collect smart meter data from one or several smart meters 200 as shown in FIG. 4. The data collector is provided to feed the scheduler with all the data neeeded for determining a scheduling for the different smart meters for the selected scheduling algorithms which will be discussed in detail below. The data collector 40 can be implemented as data concentrator positioned at a substation or transformer. However, the data collector can be an independent entity which can collect data other than the measurements (i.e. the meter data) of the smart meters. By way of example it may collect data from external data sources relevant for the system state, from a data base previously populated with measurements, alerts, and /or processed data etc. The data received by the scheduler may be received directly from the smart meters 200 or via the data collector 40. The scheduler 100 collects status parameter for the different smart meters. The status parameter may comprise a communication parameter describing a communication quality between the smart meter and the control entity 45. By way of example, it can include a ping success rate, a signal-to-noise ratio, a packet loss. The scheduler can furthermore collect status parameters which describe a service parameter indicating an electrical status of the power line 55. The service parameter can describe the service quality such as the quality of the electric power line. The service parameter can furthermore include maintenance reports. These maintenance reports may be inter alia generated to indicate to the control entity that maintenance work is done at the smart meter. The service parameter may comprise any parameter that the smart meter can measure in relation to electricity of the power line 55. A smart meter may provide one or more communication parameters, one or more service parameters, or a mixture of both. A data collector may provide data collected from a plurality of smart meters, wherein the collected data may comprise one or more communication parameters, one or more service parameters, or a mixture of both.

In the art missing capability of including in the control loop analytical results in a real-time, scalable manner prevents complex use case implementations based on smart meter measurements.

Figure 5:
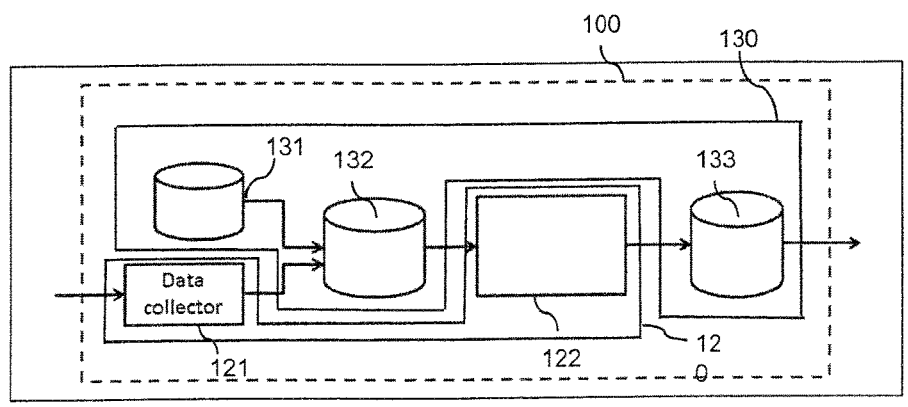
FIG. 5 shows a more detailed view of the scheduler shown in FIG. 4.

FIG. 5 shows a more detailed view of scheduler 100. In scheduler 100, the status parameters discussed above are collected by data collector 121. The data collector 121 processes the data of the metering infrastructure. They may contain smart meter identification fields, including a metering ID, a serial number and/or a model name. The collected status information can furthermore include communication parameters and service parameters. The data collector 121 is especially designed to efficiently process real-time data arriving at a varying rate without loss of information. Furthermore, information from a reference database 131 may be used, wherein the reference database 131 can comprise relevant measures of the network topology such as the feeder line ID, transformer ID, substation ID, etc. and consumer information, e.g. the name, address or contract number of the user. This enriched data is stored in a measurement database 132 for further processing. A scheduling unit 122 uses the data sets stored in the measurement database 132 in order to optimize the reporting times for the different smart meters. The result of the processing can be a reporting time, a transmission quality, a communication profile or a status parameter constraint. The different transmission parameters which all allow a reporting time for a smart meter to be determined are stored in a schedule database 133, and from there the data is provided to the control entity 45.

As will be discussed in more detail below, some of the embodiments described are designed such that the calculated reporting time is transmitted to the corresponding smart meter or the reporting time may be used by the control entity 45 to pull the measurement report at the determined reporting time. In other embodiments described below, the results of the processing are transferred to the smart meters themselves, and then the smart meters will be in charge of initiating the transmission of the measurement report to the control entity taking into account the received results of the processing.

According to a first embodiment, instead of using fixed reporting times, e.g. a time of the day to pull the reports, a randomized scheduling can be used based on a time pattern (e.g. weekly pattern) of a global communication quality. An example of the communication quality is shown in FIG. 1. This embodiment can take advantage of the inherent periodicity of the underlying system and can resolve the communication problems of the smart meters, as it can be avoided that smart meters always communicate at bad communication quality. The scheduler 100 can determine a random reporting time taking into account a transmission quality such as shown in FIG. 1. This random determination can be such that more measurement reports will be transmitted at higher communication quality and that less measurement reports are transmitted at a lower communication quality. By way of example, the higher the communication quality is, the higher the number of smart meters can be set to transmit their measurement report.

In another, second possibility the scheduler can take into account the heterogeneous feeder line properties using a separate scheduling based on machine learning algorithms. Examples for this machine learning algorithms are association rule learning, frequent pattern mining, artificial neural networks, and clustering algorithms. Long-term historical communication quality datasets may be analyzed in order to uncover communication profiles and optimized reporting time for each individual smart meter in an automated process. Furthermore, in this embodiment, one can take into account the dependence on summer and winter changes in the consumer behavior, i.e. the seasonality can be taken into account. The resulting reporting time can be saved in the schedule database 133.

Using domain knowledge of experts, a set of parameters measured by the smart meters can be used as status parameters in a further embodiment. Threshold levels can be determined and saved to the schedule database. The control entity 45 can use these predefined values and can send them to the smart meters to set their configuration. Following configuration, the smart meters can initiate reporting when the locally measured values fall within the constraints set by the threshold levels received. Systematic or seasonal changes in the thresholds can be followed by updating the schedule database when it is found necessary.

In still another embodiment, the second possibility discussed above is used together with a long-term smart meter state parameter dataset such as consumption values, voltage levels, meter device status, time of the week, alarm level, recent timeline, neighboring events etc. A machine learning algorithm can be used for each individual smart meter. The goal is the uncovering of the specific combination of locally measurable information that corresponds to their best communication quality. Here, the best reporting time is determined based on the information measured by the smart meter which may, by way of example, measure its own consumption, voltage level or other parameters and decides to initiate the reporting when a certain communication profile is present, i.e. based on the specific combination of locally measurable parameters. In addition, a measure of distance in the space of states can be defined (the communication profile) to be used as indicator for suitable reporting conditions at the smart meter. In this case, the result is the set of state parameter values and range indicators that are stored in the schedule database and used to configure the smart meters so that optimal reporting can be initiated by them on an independent basis. Regular updating of the schedule database can be used to take into account seasonality or irregularity.

Summarizing, FIG. 4 depicts a high-level schematic view of the system including the scheduler 100 and the smart meter 200. Various measurements such as status parameters comprising communication parameters and/or service parameters are collected from the data collectors 40 or smart meters 200, and the data is used by the scheduler 100. The latter provides a reporting schedule to the control system 45 that is used for controlling the timing of communication between the smart meters and the control entity, or between the data collectors and the smart meters.

In FIG. 5 the data collector 121 processes the incoming measurement reports of the smart meters or of the data collectors. This data may be enriched by the reference datasets about customers, metering point information and network topology details and stored in the measurement database 132. The scheduling unit 122 either directly determines a reporting time or other transmission parameters which allow the corresponding smart meter to determine the reporting time. The scheduling unit 122 and the data collector 121 can be part of a processor 120, wherein the different databases 131, 132 and 133 may be part of a memory 130. The memory 130 can furthermore store software modules which, when executed, result in a scheduler operating as discussed above or below.

Figure 6:
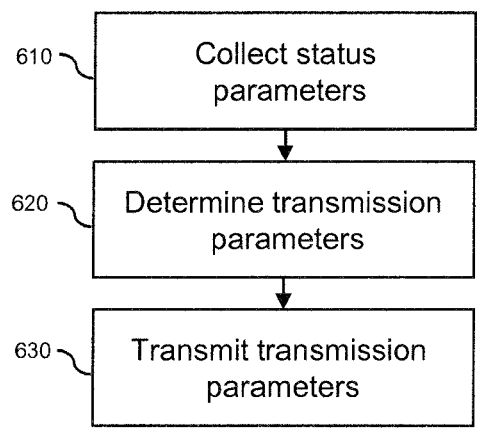
FIG. 6 shows an example flowchart of a method carried out by a scheduler of FIG. 4 or 5 in order to determine an individual reporting time for a plurality of smart meters.

FIG. 6 summarizes the steps carried out by the scheduler 100 shown in FIGS. 4 and 5. In a first step 610, status parameters are collected by the scheduler. As discussed above, the collected status parameters may comprise information such as a ping success rate or a signal-to-noise ratio of the power line 55. The collected status parameters can furthermore comprise service parameters describing an electrical status of the power line such as the voltage level of the power line or a variation of voltage level of the power line. Based on the collect status parameters, the scheduler can determine in step 620 transmission parameters. This means that for each of the smart meters an individual transmission parameter may be determined. Different examples what kind of transmission parameters are determined were discussed above. In some of the examples a reporting time was directly determined by the scheduler 100, whereas in other embodiments status parameters are collected and analyzed in order to determine a communication profile or status parameter constraints. The generated information is then transmitted to the smart meter which then can determine the reporting time based on the received information. In step 630 the determined transmission parameters are transmitted to the different smart meters.

Figure 7:
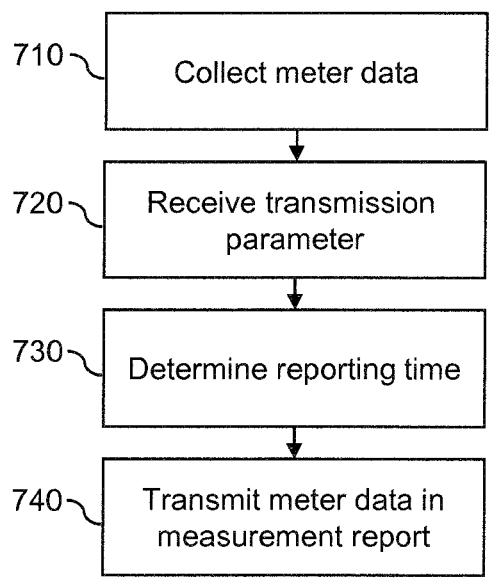
FIG. 7 shows an example flowchart of a method carried out by a smart meter collecting meter data and transmitting the meter data in a measurement report at a defined reporting time.

FIG. 7 summarizes the steps carried out by the smart meter 100. In step 710 the smart meter collects meter data of the smart meter. In step 720 the smart meter receives the transmission parameter(s) from the scheduler. In another embodiment, the transmission parameters are received from the central control entity 45 which can deduce the transmission parameter from the schedule database 133. As mentioned above, the transmission parameter can directly include the reporting time or can include other parameters such as a communication profile, a status parameter constraint or any other parameter with which the smart meter can determine the reporting time as done in step 730. The meter 100 transmits the measurement report to the control entity at the determined reporting time (step 740).

Figure 8:
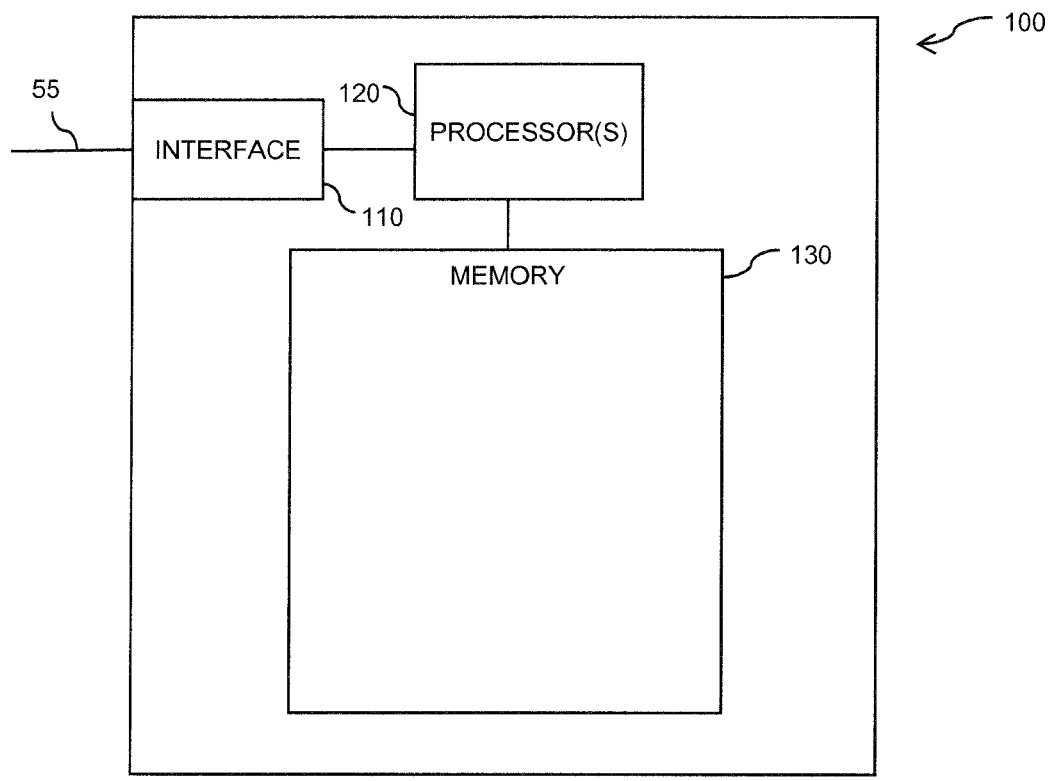
FIG. 8 shows an example schematic representation of a scheduler configured to determine a transmission parameter individually for different smart meters.

FIG. 8 is a schematic illustration of scheduler 100. The scheduler 100 comprises an interface 110 via which the scheduler 100 communicates with the smart meter and/or the control entity 45. The scheduler 100 furthermore comprises a processor 120 which is responsible for the operation of the scheduler 100. The scheduler 100 furthermore comprises a memory 130. The memory can store program code that can be executed by the processor 120. Execution of the program code stored in memory 130 can cause the processor 120 to perform techniques described above or described below in which the scheduler 100 is involved. The memory can furthermore store the different databases discussed above in connection with FIG. 5.

Figure 9:
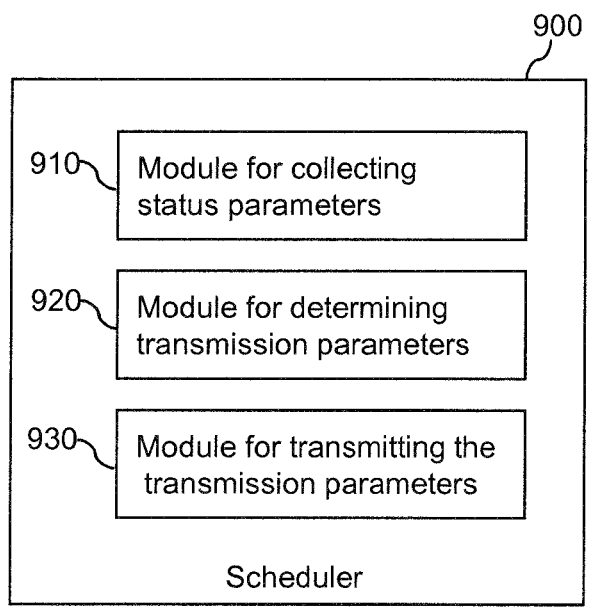
FIG. 9 shows another example schematic representation of a scheduler configured to determine a transmission parameter individually for different smart meters.

FIG. 9 shows a further embodiment of the scheduler. The schedule 900 comprises a module 910 for collecting status parameters. The status parameters can comprise communication parameters and/or service parameters. Module 910 can collect one or several of the status parameters for a single smart meter. Module 920 is provided for determining the transmission parameters. As mentioned above, it can directly determine a reporting time or other parameters which allow a smart meter to determine the reporting time based on the determined transmission parameter. Furthermore a module 930 is provided for transmitting the transmission parameter to the corresponding smart meters.

Figure 10:
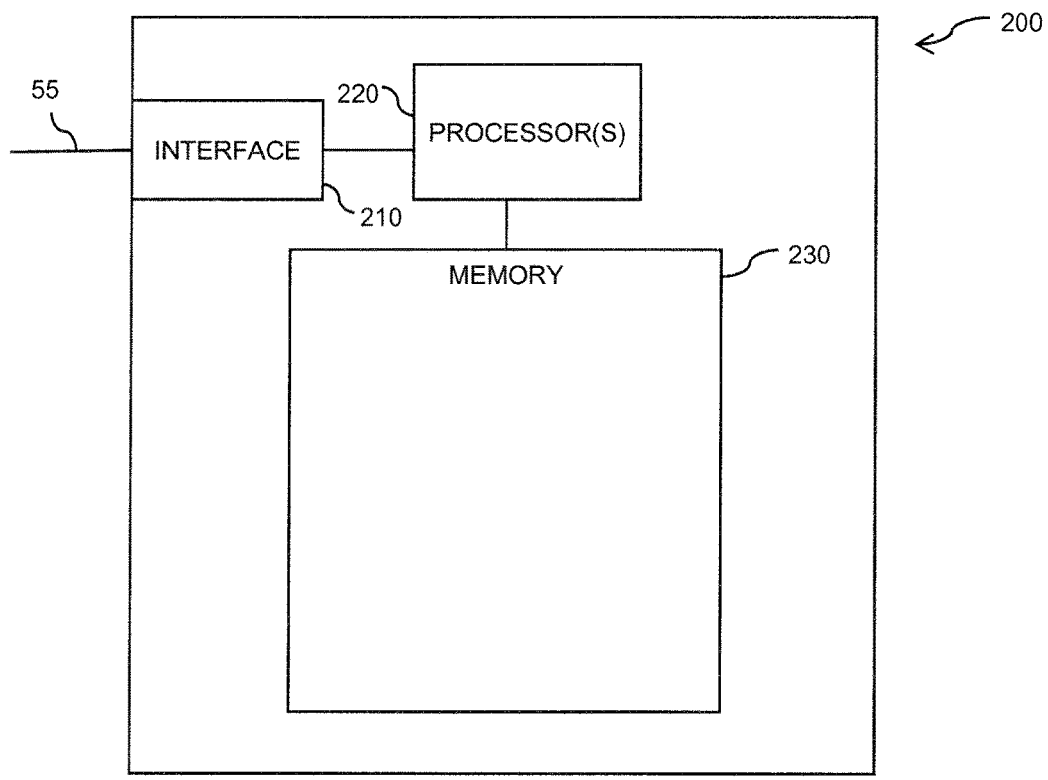
FIG. 10 shows a schematic representation of a smart meter configured to collect meter data and configured to transmit a measurement report at a defined reporting time.

FIG. 10 is a schematic view of a smart meter 200 involved. The smart meter comprises an interface 210 which is used for the communication with the scheduler 100 or the control entity 45. The interface is connected to power line 55. The smart meter 200 furthermore comprises a processor which is responsible for the operation of the smart meter 200. The smart meter 200 furthermore comprises a memory 230. The memory can store program code that can be executed by the processor 220. Execution of the program code stored in the memory 230 can cause the processor 220 to perform techniques described above or described in more detail below in which the smart meter is involved. The smart meters' memory can furthermore store any other information needed by the smart meter for its operation. It should be understood that the smart meter may comprise other functional modules needed for the operation of the smart meter.

Figure 11:
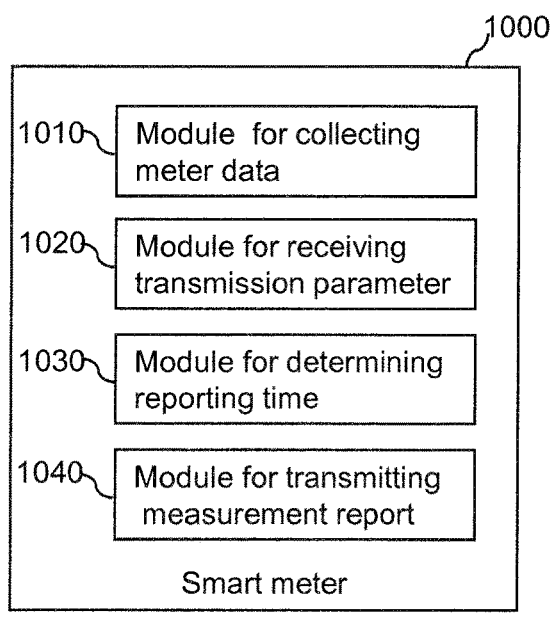
FIG. 11 shows another example schematic representation of a smart meter configured to collect meter data and configured to transmit a measurement report at a defined reporting time.

FIG. 11 shows a further embodiment of a smart meter. The smart meter 1000 comprises a module 1010 for collecting meter data. A module 1020 is provided for receiving the transmission parameter. A module 1030 is provided for determining the reporting time at which the meter data should be transmitted to the control entity. Furthermore, a module 1040 is provided for transmitting the measurement report.

From the above said some general conclusions can be drawn.

As far as the scheduler is concerned, the scheduler 100 can collect at least one status parameter which can comprise at least one communication parameter describing a communication quality between the smart meter and the control entity. The parameter can comprise parameters such as a ping success rate, a signal-to-noise ratio of the power line 55 or a packet loss. The status parameter can furthermore comprise a service parameter describing an electrical status of the power line 55 which is part of the connection of the corresponding smart meter to the control entity 45 or the data collector 40. The service parameter can be a voltage level of the power line, a power consumption of the consumer elements connected to the same power line and a variation of the voltage level.

When the scheduler collects the at least one status parameter, it can receive the at least one status parameter from the smart meter. Furthermore it may determine a smart meter identification of the corresponding smart meter present in the received status parameter and may add at least one of a topology information, where in a powerline network the smart meter is located, and a consumer information with which the consumer of electricity the smart meter is measuring can be identified, to the status parameter. The status parameter with optionally added topology information and/or the added consumer information is stored as enriched data in the parameter database 132.

Determining of the at least one transmission parameter for each of the smart meters can comprise determining of a reporting time for each of the smart meters 200.

Furthermore, it is possible that determining the at least one transmission parameter for each of the smart meter may comprise the feature that at least one transmission condition is determined for each of the smart meters upon which the corresponding smart meter is able to determine when the transmission of the measurement report should be initiated by the smart meter.

Furthermore it is possible that some measurement reports are pushed by the smart meters to the scheduler whereas for other smart meters the measurement reports are pulled by the scheduler from the smart meters.

Furthermore, the scheduler may determine a transmission quality over time indicating a success rate of the transmission of the measurement reports for each of the smart meters based on the collected status parameter. The reporting times for the different smart meters are then randomly distributed over time taking into account the transmission quality for the plurality of smart meters over time.

Furthermore, the scheduler can determine a transmission quality over time indicating a success rate of the transmission of the measurement report for each of the smart meters based on the collected status information and may analyze the transmission quality over time in order to generate a communication profile for the corresponding smart meter which indicates an optimized reporting time for the measurement report of the corresponding smart meter.

Furthermore, the scheduler may determine at least one status parameter which can be determined by the corresponding smart meter and at least one status parameter constraint.

The status parameter constraint is transmitted to the smart meter wherein the transmission of the measurement report should be initiated by the smart meter when the at least one status parameter constraint is met by the corresponding smart meter.

Furthermore, the scheduler may analyze the at least one status parameter over time in order to generate at least one status constraint for the corresponding smart meter, with which the corresponding smart meter is able to initiate the transmission of the measurement report when the at least one status constraint is met at the corresponding smart meter.

As far as the smart meter is concerned, the smart meter can receive a status parameter constraint of a status parameter, wherein the status parameter influences a success rate of the transmission of the measurement report to the control entity. The smart meter then monitors the at least one status parameter and, when the monitored status parameter meets the status parameter constraint, the transmission of the measurement report is initiated.

The smart meter may also receive a plurality of status parameters with corresponding status parameter ranges. The different status parameters influence the success rate of the transmission for the corresponding measurement report. The smart meter then monitors the status parameters at the smart meter and determines a reporting condition based on the monitored status parameters and the corresponding status parameter ranges. The measurement report is then transmitted to the control entity at a reporting time which is determined based on the determined reporting condition.

The computer readable storage medium on which the computer programs are stored could be any computer readable signal medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Summarizing, the proposed scheduler connects the local state or status information (e.g. consumption, voltage level, etc.) of the smart meters to the communication quality of the SMs. From this connection the scheduler calculates scheduling proposals to the control entity and SMs to optimize their communication pattern.

In detail, the proposed scheduler 1) analyzes all the local status information that are relevant in elaborating the reporting schedule of smart meters, 2) manages the report collection by pulling or receiving meter reports according to their individual transmit schedule schema.

As opposed to commonly used global reporting schedules, the proposed system and method enable an advanced scheduling of the smart meter reporting based on relevant local status indicators and metrics. This reduces the often severe delays of meter reports registered at the HES.

The system enables several transmit schemes: it is possible to implement different algorithms from simple adapted randomization strategy to complex long-term machine learning based solutions in a modular manner. According to the applied strategy, the scheduling can be based on historical analysis or even enable a decision that utilizes real-time information efficiently.

By using the proposed solution, the existing smart meter infrastructure becomes capable of near real-time control using the near optimal communication quality for reliable and continuous measurement transmission. A cloud compute platform may be used to implement the scheduler which enables efficient processing and real-time analytics. The scheduler may be implemented by a cloud compute platform by a plurality of interconnected processing entities which in sum carry out the the above mentioned steps in which the scheduler is involved. The scheduler may be implemented as a plurality of different processing entites in a system, wherein the system or each of the processing entities of the system is configured to determine for each of the plurality of smart meters, the at least one transmission parameter allowing the reporting time for the corresponding smart meter to be determined, based on at least one status parameter obtained for each of the plurality of smart meters, the at least one status parameter influencing a success rate of the transmission of the corresponding measurement report to the control entity. Obtaining the at least one status parameter may comprise receiving the at least one status parameter. The at least one status parameter may be obtained for each of the plurality of smart meters directly from the smart meters or indirectly from another entity. If more than one status parameter is obtained a mixture of direct and indirect obtaining is possible. The other entity maybe one or more of the processing entities of the system, or an entity outside the system, for example a data concentrator or data collector.

By applying this solution, the efficiency and the quality of the communication between the smart meters and the control entity will significantly increase. The message loss rate is decreasing due to the better adaptation to the measured signal-to-noise ratio of the communication line. Due to the lower loss rate, the number of retransmissions is decreased as well. The delay of receiving smart meter events and logs decreases which reduces the time delay of the necessary action taken by the utility company.

Furthermore, the proposed system uses information that is already available in smart meters and the installation of the system requires the setup of a single central management server for the scheduler and may not require replacing equipment in the already existing metering infrastructure.

The invention claimed is:

1. A method for determining, by a scheduler, at least one transmission parameter for each of a plurality of smart meters which each transmit, via power line communication, a measurement report to a control entity, comprising:
   collecting at least one status parameter for each of the plurality of smart meters, the collected at least one status parameter influencing a success rate of the transmission of the corresponding measurement report to the control entity, wherein the at least one status parameter comprises one or more communication parameters describing a communication quality between a corresponding smart meter and the control entity, and
   determining, for each of the plurality of smart meters, the at least one transmission parameter allowing a reporting time for the corresponding smart meter to be determined, based on the collected at least one status parameter.

2. The method according to claim 1, wherein the at least one status parameter comprises one or more service parameters describing an electrical status of a power line which is part of a connection of the corresponding smart meter to the control entity.

3. The method according to claim 1, wherein collecting the at least one status parameter for each of the plurality of smart meters comprises:
   receiving the at least one status parameter of the corresponding smart meter,
   determining a smart meter identification of the corresponding smart meter present in the received at least one status parameter, and
   adding at least one of a topology information where in a power line network the smart meter is located, and a consumer information with which the consumer of the electricity the corresponding smart meter is measuring can be identified, to the at least one status parameter,
   storing the received at least one status parameter with the added topology information and/or the added topology information as enriched data in a parameter database.

4. The method according to claim 1, wherein determining the at least one transmission parameter for each of the plurality of smart meters comprises one or more of determining a reporting time for each of the plurality of smart meters and determining at least one transmission condition for each of the plurality of smart meters upon which the corresponding smart meter is able to determine when the transmission of measurement report should be initiated by the corresponding smart meter.

5. The method according to claim 1, wherein determining the at least one transmission parameter comprises one or more of:
   determining a transmission quality over time indicating a success rate of the transmission of the measurement reports for each of the plurality of smart meters based on the collected at least one status parameter, wherein the reporting times for each of the plurality of smart meters are randomly distributed over time taking into account the transmission quality for each of the plurality of smart meters over time;

determining a transmission quality over time indicating a success rate of the transmission of the measurement reports for each of the plurality of smart meters based on the collected at least one status parameter and analyzing the transmission quality over time in order to generate a communication profile for the corresponding smart meter which indicates an optimized reporting time for the measurement report of the corresponding smart meter;

determining at least one status parameter which can be determined by the corresponding smart meter, and at least one status parameter constraint, wherein the transmission of the measurement report should be initiated by the corresponding smart meter when the at least one status parameter constraint is met at the corresponding smart meter; and analyzing the collected at least one status parameter over time in order to generate at least one status constraint for the corresponding smart meter, with which the corresponding smart meter is able to initiate the transmission of measurement report when the at least one status constraint is met at the corresponding smart meter.

6. The scheduler according to claim 1, wherein the scheduler is operative to:

determine a transmission quality over time indicating a success rate of the transmission of the measurement reports for each of the plurality of smart meters based on the collected at least one status parameter, and analyze the transmission quality over time in order to generate a communication profile for the corresponding smart meter which indicates an optimized reporting time for the measurement report of the corresponding smart meter.

7. A method for operating a smart meter connected via a power line to a control entity, comprising:

collecting meter data of the smart meter, receiving at least one transmission parameter, the at least one transmission parameter allowing a reporting time for a measurement report comprising the collected meter data of the smart meter to be determined, determining the reporting time taking the received at least one transmission parameter into account, transmitting the measurement report to the control entity at the determined reporting time.

8. The method according to claim 7, wherein receiving the at least one transmission parameter comprises one or more of:

receiving a status parameter constraint of a status parameter, the status parameter influencing a success rate of the transmission of the measurement report to the control entity, wherein the status parameter is monitored and when the monitored the status parameter meets the status parameter constraint, the transmission of the measurement report is initiated;

receiving a plurality of status parameters with corresponding status parameter ranges, the status parameters influencing a success rate of the transmission for the corresponding measurement report;

monitoring the plurality of status parameters at the smart meter; and determining a reporting condition based on the monitored status parameters and the corresponding status parameter ranges, wherein the measurement report is transmitted to the control entity at the reporting time which is determined based on the determined reporting condition.

9. A scheduler configured to determine at least one transmission parameter for each of a plurality of smart meters which each transmit, via power line communication, a measurement report to a control entity, the scheduler comprising:

a processor; and a memory coupled with the processor, wherein the memory contains instructions executable by the processor whereby the scheduler is operative to:

collect at least one status parameter for each of the plurality of smart meters, the collected at least one status parameter influencing a success rate of the transmission of the corresponding measurement report to the control entity, wherein the collected at least one status parameter comprises one or more communication parameters describing a communication quality between a corresponding smart meter and the control entity, and determine, for each of the plurality of smart meters, the at least one transmission parameter allowing a reporting time for the corresponding smart meter to be determined, based on the collected at least one status parameter.

10. The scheduler according to claim 9, wherein the scheduler is further operative to:

receive at least one status parameter of the corresponding smart meter, determine a smart meter identification of the corresponding smart meter present in the received at least one status parameter, and add at least one of a topology information where in a power line network the smart meter is located, and a consumer information with which the consumer of the electricity the smart meter is measuring can be identified, to the received at least one status parameter, store the received at least one status parameter with the added consumer information and/or the added topology information as enriched data in a parameter database.

11. The scheduler according to claim 9, wherein the scheduler is further operative to determine a reporting time for each of the plurality of smart meters, and to transmit the corresponding reporting time to each of the plurality of smart meters.

12. The scheduler according to claim 9, wherein the scheduler is operative to:

determine at least one transmission condition for each of the plurality of smart meters upon which the corresponding smart meter is able to determine when the transmission of measurement report should be initiated by the corresponding smart meter, transmit the at least one transmission condition to the corresponding smart meter.

13. The scheduler according to claim 9, wherein the scheduler is operative to:

determine a transmission quality over time indicating a success rate of the transmission of the measurement reports for each of the plurality of smart meters based on the collected at least one status parameter, distributing the reporting times for each of the plurality of smart meters randomly over time taking into account the transmission quality for each of the plurality of smart meters over time.

14. The scheduler according to claim 9, wherein the scheduler is operative to:
  determine at least one status parameter which can be determined by the corresponding smart meter, and at least one status parameter constraint, wherein the transmission of the measurement report should be initiated by the corresponding smart meter when the at least one status parameter constraint is met at the corresponding smart meter, and
  transmit the at least one status parameter constraint to the corresponding smart meter.

15. The scheduler according to claim 9, wherein the scheduler is operative to:
  analyze the collected at least one status parameter over time in order to generate at least one status constraint for the corresponding smart meter, with which the corresponding smart meter is able to initiate the transmission of measurement report when the at least one status constraint is met at the corresponding smart meter; and
  transmit the at least one status constraint to the corresponding smart meter.

16. A smart meter configured to generate measurement data, the smart meter comprising:
  at least one processor; and
  a memory coupled with the at least one processor, the memory containing instructions executable by said at least one processor, whereby the smart meter is operative to:
  collect meter data of the smart meter,
  receive at least one transmission parameter, the at least one transmission parameter allowing a reporting time for a measurement report comprising the collected meter data for the smart meter to be determined,
  determine the reporting time taking the received at least one transmission parameter into account, and
  transmit the measurement report to the control entity at the determined reporting time.

17. The smart meter according to claim 16, whereby the smart meter is further operative to:
  receive a status parameter constraint of a status parameter, the status parameter influencing a success rate of the transmission of the measurement report to the control entity,
  monitor the status parameter and when the monitored status parameter meets the status parameter constraint, the transmission of the measurement report is initiated.

18. The smart meter according to claim 16, whereby the smart meter is operative to:
  receive a plurality of status parameters with corresponding status parameter ranges, the status parameters influencing a success rate of the transmission for the corresponding measurement report,
  monitor the plurality of status parameters at the smart meter,
  determine a reporting condition based on the monitored status parameters and the corresponding status parameter ranges, wherein the measurement report is transmitted to the control entity at the reporting time which is determined based on the determined reporting condition.

19. A non-transient computer readable storage medium, having stored thereon a computer program, wherein execution of the computer program by at least one processor of a scheduler causes the at least one processor to execute a method for determining, by a scheduler, at least one transmission parameter for each of a plurality of smart meters which each transmit, via power line communication, a measurement report to a control entity, comprising:
  collecting at least one status parameter for each of the plurality of smart meters, the collected at least one status parameter influencing a success rate of the transmission of the corresponding measurement report to the control entity, wherein the collected at least one status parameter comprises one or more communication parameters describing a communication quality between a corresponding smart meter and the control entity, and
  determining, for each of the plurality of smart meters, the at least one transmission parameter allowing a reporting time for the corresponding smart meter to be determined, based on the collected at least one status parameter.

20. A non-transient computer readable storage medium, having stored thereon a computer program, wherein execution of the computer program by at least one processor of a smart meter causes the at least one processor to execute a method for operating a smart meter connected via a power line to a control entity, comprising:
  collecting meter data of the smart meter,
  receiving at least one transmission parameter, the at least one transmission parameter allowing a reporting time for a measurement report comprising the collected meter data of the smart meter to be determined,
  determining the reporting time taking the received transmission parameter into account,
  transmitting the measurement report to the control entity at the determined reporting time.

* * * * *